United States Patent [19]

Donovan et al.

[11] Patent Number: 6,072,951

[45] Date of Patent: Jun. 6, 2000

[54] PROFILE DRIVEN OPTIMIZATION OF FREQUENTLY EXECUTED PATHS WITH INLINING OF CODE FRAGMENT (ONE OR MORE LINES OF CODE FROM A CHILD PROCEDURE TO A PARENT PROCEDURE)

[75] Inventors: Robert John Donovan; Robert Ralph Roediger; William Jon Schmidt, all of Rochester, Minn.

[73] Assignee: International Business Machines Corporation, Armonk, N.Y.

[21] Appl. No.: 08/950,612

[22] Filed: Oct. 15, 1997

[51] Int. Cl.[7] .................................................. G06F 9/44
[52] U.S. Cl. ............................................................ 395/709
[58] Field of Search .................................... 395/709, 700, 395/703, 702, 704, 705, 707, 708

[56] References Cited

U.S. PATENT DOCUMENTS

| 5,212,794 | 5/1993 | Pettis et al. | 395/700 |
|---|---|---|---|
| 5,452,440 | 9/1995 | Salsburg | 395/463 |
| 5,664,191 | 9/1997 | Davidson et al. | 395/670 |
| 5,689,712 | 11/1997 | Heisch | 395/704 |
| 5,768,595 | 6/1998 | Gillies | 395/709 |
| 5,790,858 | 8/1998 | Vogel | 395/704 |

OTHER PUBLICATIONS

Ayers et al., Aggressive inlining, ACM SIGPLAN Notices, vol. 32, No. 5, (May 1997) pp. 134–135.

Chang et al., Profile–guided automatic inline expansion for C programs, Software Practice and Experience, vol. 22(5), (May 1992) pp. 349–369.

Davidson et al., Subprogram inlining: at study of its effects on program execution line, Software Engineering, IEEE Transactions, vol. 18, Issue 2, (Feb. 1992) pp. 89–102.

Dean et al., *Towards Better Inlining Decisions Using Inlining Trials*, LISP (Jun. 1994) pp. 273–282.

DeBosschere et al., *alto: A Link–Time Optimizer for the DEC Alpha*, National Science Foundation, Jul. 1996.

Goubault, Jean, *Generalized Boxings, Congruences and Partial Inlining*, Proceedings of First International Static Analysis symposium, SAS '94, Namur, Belgium Sep. 28–30 1994, pp. 147–155.

Pugh, William, *Skip Lists: A Probabilistic–Alternative to Balanced Trees*, Communications of the ACM, Jun. 1990, vol. 33, No. 6, pp. 668–676.

R. Muth et al., "Partial Inlining" publication on the Worldwide Web, Nov. 1997.

Choi et al., *Automatic Construction of Sparse Data Flow Evaluation Graphs*, Proc. 18th Annual ACM Symposium on Principles of Programming Languages, pp. 55–66, Jan. 1991.

Briggs et al., An Efficient Representation of Sparse Sets, ACM Letters on Programming Languages and Systems, vol. 2, Nos. 104, Mar–Dec 1993, pp. 59–69.

Heisch, R.R., Trace–directed program restructuring for AIX executables., IBM J. Res. Develop., vol. 38, No. 5, Sep. 1994.

Pettis et al., *Profile Guided Codes Positioning*, ACM SIGPLAN '90, Conference on Programming Language Design and Implementation, Jun. 20–22, 1990.

Skip Lists: A Probabilistic Alternative to Balanced Trees Wlliam Pugh, Jun. 1990.

(List continued on next page.)

*Primary Examiner*—Tariq R. Hafiz
*Assistant Examiner*—Todd Ingberg
*Attorney, Agent, or Firm*—Wood, Herron & Evans, L.L.P.

[57] ABSTRACT

A compiler and method of compiling provide enhanced performance by inlining one or more frequently executed paths through a child procedure into a parent procedure without inlining the entire child procedure. Accordingly, a substantial improvement in speed of execution of the program can be achieved by reducing procedure call overhead, with reduced expense in terms of program size as compared to traditional inlining. Various criteria for determining whether to inline particular child procedures are also described.

26 Claims, 4 Drawing Sheets

OTHER PUBLICATIONS

The C + + Programming Language, B. Stroustrup, Third Edition pp. 82–84, Jul. 1997.

Principles of Compiler Design, Aho et al., pp. 55,58,341–347,350,375–376, Dec. 1979.

Flow–directed inlining S. Jagannathan et al. May 1996.

Compiling C for vectorization, Parallelization and inline expansion, R. Allen et al., Jun. 1988.

Inline function expansion for compiling C programs Hwu et al., Jun. 1989.

Microsoft's Source Profiler User's Guide —entire manual, 1993.

Compiler Principles, Techniques and Tools Aho et al. p. 280, Sep. 1985.

PROFILE DRIVEN OPTIMIZATION OF FREQUENTLY EXECUTED PATHS WITH INLINING OF CODE FRAGMENT (ONE OR MORE LINES OF CODE FROM A CHILD PROCEDURE TO A PARENT PROCEDURE)

FIELD OF THE INVENTION

The invention relates to optimizing compilers and methods of compiling. More particularly, the invention relates to optimizing routines used in compiling which use inlining.

BACKGROUND OF THE INVENTION

Compilers are generally used to transform one representation of a computer program into another representation. Typically, but not exclusively, compilers are used to transform a human readable form of a program such as source code into a machine readable form such as object code.

A computer program suitable for compilation by a compiler is composed of a series of "statements". Some statements generate, modify, retrieve or store information. Other statements may control the flow of the program, for example, by testing the value of a variable and causing program flow to continue in different directions based on the value of the variable. In most programs of any significant length, the statements are collected into "procedures", which perform well-defined functions and can be used in potentially multiple places with the program. Frequently, the procedures in a large program are further collected into "modules", each of which is responsible for a particular major subset of the functions of the program. In a program structure of this kind, the compiler is used to compile the modules individually, after which the compiled modules are "linked" together to form a single, cohesive computer program. This approach allows the programmer to upgrade or debug, and then recompile, each module separately, without need for recompiling the other modules.

One type of compiler is an optimizing compiler which includes an optimizer for enhancing the performance of the machine readable representation of a program. Some optimizing compilers are separate from a primary compiler, while others are built into a primary compiler to form a multi-pass compiler. Both types of compilers may operate either on a human readable form, a machine readable form, or any intermediate representation between these forms.

One optimization technique is known as "profiling" the program. A program is profiled by compiling the program, and delivering it to a test environment which simulates actual field operation of the program. While the program operates in the test environment, records are kept on the extent to which certain sections of the program are used. After the test has been completed, the profile records are used by an optimizing compiler, to recompile the program in a manner which enhances the efficiency of the program. For example, one known technique is to place sections of the program which are used at approximately the same time, in nearby memory locations, so as to speed access to the program.

A common computer programming approach is known as procedural programming. In procedural programming, a program is broken into many small procedures, each including a sequence of statements (and in some cases, data), and each of which is responsible for particular well-defined activities. The procedures are invoked when particular actions are needed. Typically, procedures can invoke each other, as part of operation of the program. In such a situation, the procedure which is invoked is typically referred to as the "child" procedure, and the procedure which invokes the child procedure is referred to as the "parent" procedure.

While procedural programming can simplify programming effort and reduce complexity, one of the unfortunate results of a highly procedural computer program, is that the program, when operating, frequently transfers control between the various procedures (executes "procedure calls"). This creates a substantial overhead, in that each transfer of control between procedures requires multiple computer operations, both to transfer flow control to a procedure and to return flow control from the procedure.

A similar unfortunate result occurs in so-called "object oriented" programming. In object oriented programming, data and a set of procedures (called "methods") are encapsulated together, and only the procedures encapsulated with data are permitted to modify that data. This style of programming naturally causes procedure calls to proliferate, typically to a greater extent than procedural programming.

To address the problem of high procedure call overhead, modern compilers optimize programs so as to avoid procedure calls. One optimization approach is to "inline" procedures, that is, to copy the entire body of the child procedure, into the body of the parent procedure, at each location in the parent procedure where the child procedure is referenced. This is usually done only when the child procedure is relatively small and is called from relatively few locations, in order to minimize the extent to which the overall compiled program size is increased due to inlining.

SUMMARY OF THE INVENTION

Unfortunately, traditional inlining is often unable to substantially reduce the procedure call overhead of a program where to do so would be highly advantageous. In particular, when calling a procedure that usually executes only a small number of instructions before returning to its parent, the procedure call overhead is a large fraction of the cost of executing the procedure. For example, it is typical for a computer program to include a fairly large procedure that checks for error conditions. If no error condition has occurred, the procedure returns, after executing only a small number of statements. Only if there is an error condition, will any of the rest of the statements of the procedure be executed (e.g., to create screen displays warning of the error, etc.) If a procedure of this kind contains a significant number of instructions that are not usually executed, traditional methods are unlikely to inline the procedure.

The present invention builds on the recognition that most of the statements in many large procedures found in typical computer programs are rarely if ever executed, and provides a form of inlining optimization that appropriately handles large procedures in which most of the statements in the large procedure are rarely or never used.

In accordance with principles of the present invention, an optimizing compiler utilizes inlining to improve the performance of a computer program having a parent procedure which calls a child procedure. Instead of inlining an entire child procedure into the parent procedure, one or more selected paths through the child procedure are identified and inlined into the parent procedure, without inlining at least one path through the child procedure into the parent procedure. Because only one or more selected paths through the child procedure have been inlined, the procedure call overhead of the program can be reduced, at a reduced total increase in program size as compared to total inlining of the child procedure.

In disclosed specific embodiments, the computer program is evaluated to determine path frequencies for each procedure prior to operation of the optimizing compiler. The optimizing compiler uses the path frequency data to select the most frequently traversed path(s) through the child procedure. The most frequently traversed path(s) through the child procedure is(are) then inlined into the parent procedure. All paths which deviate from the most frequently traversed path(s) of the child procedure, are then replaced with fixup code. In the disclosed specific embodiment, the fixup code includes a call to a complete, compiled version of the original child procedure.

In the disclosed specific embodiment, a child procedure whose frequently executed path(s) has(have) side effects other than writes to automatic storage locations, is not inlined. Furthermore, when inlining a child procedure whose frequently executed path(s) has(have) writes to automatic storage locations, the inlined frequently executed path(s) of the child procedure is(are) modified prior to inlining, so that the writes to automatic storage locations refer to copies of the automatic storage locations used in the original child procedure. These steps ensure that whenever flow through the child procedure deviates from the inlined path(s), flow can be re-directed (through the fixup code) to the complete original child procedure, without any unwanted residual side effects of the initial partial pass through the inlined path(s) of the child procedure.

In the specific disclosed embodiment, a child procedure whose most frequently executed path(s) exceeds a predetermined size, is not inlined. Furthermore, a child procedure which deviates from its most frequently executed path(s) more than a predetermined percent of the time, is not inlined. The predetermined size and percentage can be adjusted so that the frequently executed path(s) of a child procedure is(are) inlined only when the result will improve overall performance of the program.

In a further aspect, the invention features a computer system for compiling a computer program into a machine-readable representation, comprising an optimizer that optimizes the computer procedure into an optimized representation by identifying frequently traversed path(s) through the child procedure, and inlining the frequently traversed path(s) of the child procedure into the parent procedure in place of the procedure call from the parent procedure to the child procedure, without inlining at least one other path through the child procedure.

In still a further aspect, the invention features a program product configured to optimize a computer procedure by inlining frequently traversed path(s) in accordance with the aspects described above, and a signal bearing media bearing the program, which may be a transmission type media or a recordable media.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described embodiments of the invention.

DETAILED DESCRIPTION

Prior to discussing the operation of embodiments of the invention, a brief overview discussion of compilers and compiling techniques is provided herein.

Overview of Compilers

Compilers and the like are generally known in the art. One known type of compiler is a multi-pass optimizing compiler, which includes a front-end for converting source code into an intermediate representation, and a back-end which takes the intermediate representation and generates object code.

The front-end of a multi-pass optimizing compiler typically includes a lexicographic analyzer which identifies tokens or keywords in the source code, and a parser which analyzes the program statement by statement. The parser typically uses a context-free grammar to determine if program statements satisfy a set of grammar rules, and builds constructs. The parser then generates an intermediate representation using an intermediate code generator.

The back-end of a multi-pass optimizing compiler typically includes an optimizer which operates on the intermediate representation to generate a revised or optimized intermediate representation. Several different optimizations may be performed, including but not limited to local optimizations such as value numbering, elimination of redundant computations, register allocation and assignment, instruction scheduling to match specific machine characteristics, moving invariant code out of loops, strength reduction, induction variable elimination, and copy propagation, among others. The back-end also includes a final code generator to generate the object code from the revised intermediate representation.

One of the tasks typically performed by a compiler is to generate, from the source code or intermediate representation of a computer program, object code that handles the allocation and use of memory space. Memory space to represent a variable may be allocated in different ways according to specifications made in the source code. For example, a variable declared "static" will be allocated a permanent memory location throughout the execution of the program. However, a variable declared to be "automatic" will only be allocated a memory location when the procedure containing the variable declaration is invoked. When this procedure finishes executing, the memory locations assigned to its automatic variables are relinquished for possible reuse by another procedure. This means that no assumptions can be made about the contents of an automatic variable's memory location when a procedure begins executing; indeed, the location used for an automatic variable is likely to be different during separate invocations of the same procedure.

A compiler may reside within the memory of the computer system upon which the object code generated by the compiler is executed. Alternatively, a compiler may be a cross-compiler which resides on one computer system to generate object code for execution on another computer system. Either type of compiler may be used consistent with the invention.

One suitable back-end for use with the invention is an AS/400 optimizing translator supplied with an AS/400 minicomputer, which is a common back-end of an optimizing compiler. This product may be used with a front-end such as the ILE C Compiler available from IBM, among others. It will be appreciated that other compilers are suitable for different languages and/or different hardware platforms, and may also be used in the alternative.

Computer System

Figure 1:
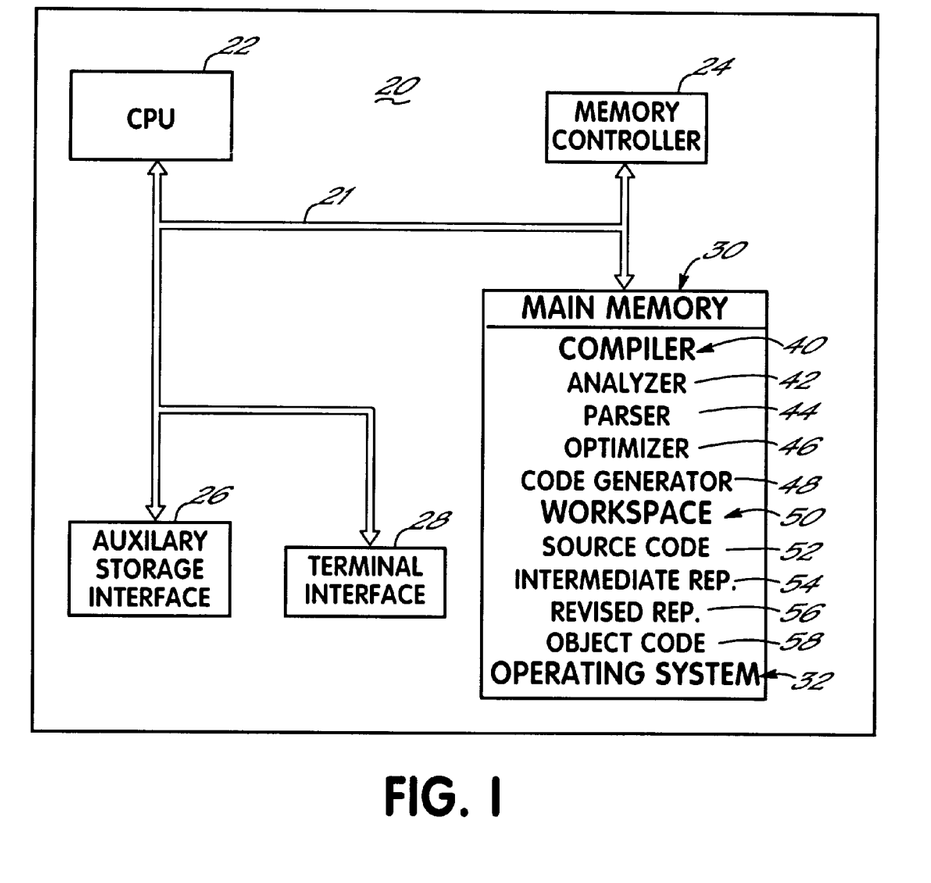
FIG. 1 is a block diagram of a computer system consistent with the invention.

Turning to the Drawing, wherein like numbers denote like parts throughout the several views, FIG. 1 shows a block diagram of a computer system 20 consistent with the invention. Computer system 20 is an IBM AS/400 minicomputer. However, those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 28.

Auxiliary storage interface 26 allows computer system 20 to store and retrieve information from auxiliary storage such as magnetic disk, magnetic tape or optical storage devices. Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Terminal interface 28 allows system administrators and computer programmers to communicate with computer system 20, normally through programmable workstations. Although the system depicted in FIG. 1 contains only a single main CPU and a single system bus, it will be understood that the invention also applies to computer systems having multiple CPUs and buses.

Main memory 30 is shown storing a compiler 40 (comprising analyzer 42, parser 44, optimizer 46 and code generator 48) and operating system 32. Memory 30 also includes a workspace 50, which is shown storing a computer program in various stages of compilation, including a source code representation 52, an intermediate representation 54, a revised and optimized representation 56 and object code 58. However, it should be understood that main memory 30 will not necessarily always contain all parts of all mechanisms shown. For example, portions of compiler 40 and operating system 32 will typically be loaded into caches in CPU 22 to execute, while other files may well be stored on magnetic or optical disk storage devices. Moreover, the various representations 52–58 of a computer program may not be resident in the main memory at the same time. Various representations may also be created by modifying a prior representation in situ. In addition, as discussed above, the front-end and back-end of the compiler, in some systems, may be separate programs.

It will be appreciated that computer system 20 is merely an example of one system upon which the routines in accord with principles of the present invention may execute. Further, as innumerable alternative system designs may be used, principles of the present invention are not limited to any particular configuration shown herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Use of Computer System

Figure 2:
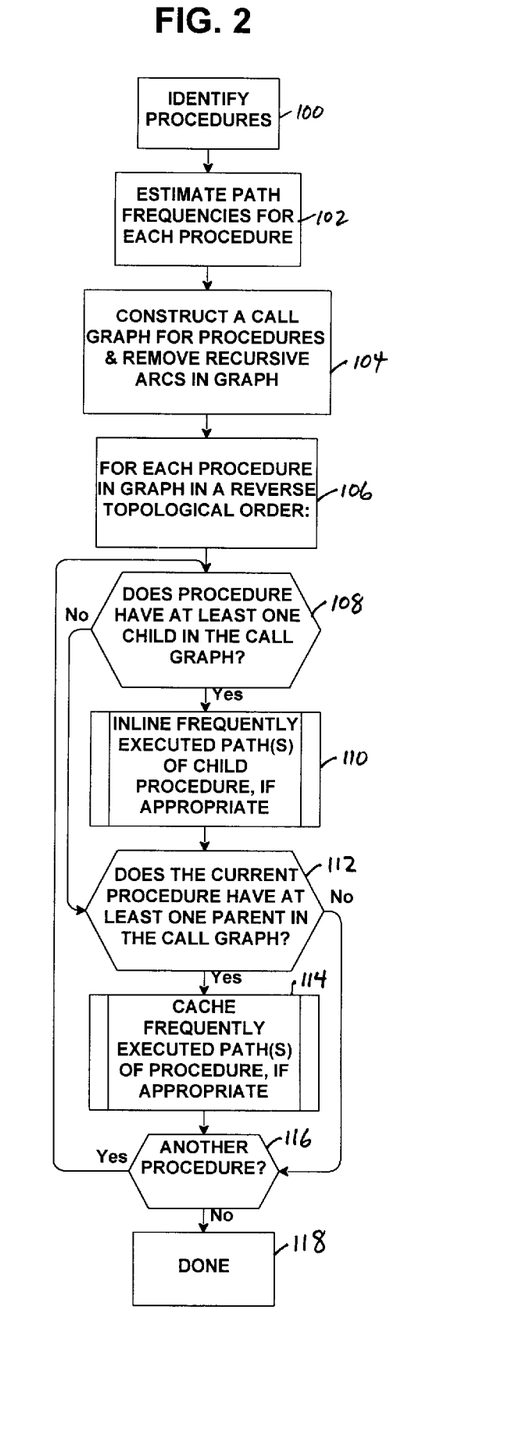
FIG. 2 is a flow chart of specific operations performed as part of an optimization of a computer program using inlining in accordance with principles of the present invention.

Referring now to FIG. 2, in accordance with principles of the present invention, an optimizing compiler operates upon a computer program including one or more procedures by initially identifying each of the procedures in the program (step 100). Next, an estimate of the relative frequencies of paths through each procedure is gathered (step 102). Such an estimate may be obtained using one of several methods known to those skilled in the art. For example, dynamic profiling may be employed to gather frequencies from sample executions of the program; or heuristics may be used during compilation to make static estimates of path frequencies without run-time information; or directives may be placed by the programmer in the source code of the program, indicating which paths are expected to be most frequently executed. Any method of estimating path frequencies may be used within the spirit and scope of the invention.

After estimating path frequencies, a call graph is constructed for the program being compiled (step 104). There is a "node" in the call graph for each procedure in the program, and an "arc" from a node A to a node B if and only if the procedure represented by node A contains code that invokes the procedure represented by node B.

Additional terminology relative to the call graph can be useful in further understanding the use of the call graph. When a first node in the call graph can be reached by following one or more arcs from a second node in the call graph through zero or more intermediate nodes, then the first node in the call graph is referred to as a "descendant" of the second node, and the second node is referred to as an "ancestor" of the first node. A descendant-ancestor relationship between two nodes indicates that the procedure represented by the descendant node can be invoked as part of executing the ancestor node.

If generated in exactly the above manner, the call graph can include recursion; that is, it may be possible to follow arcs in the graph around a loop of nodes. Recursions of this kind must be eliminated, and this is done in step 104 by not creating arcs from a node to an ancestor of that node. This approach prevents recursive arcs from being stored in the call graph.

After generating the call graph, a loop including steps 108, 110, 112, 114 and 116 is performed for each of the nodes in the call graph. The nodes are selected (step 106) in a reverse topological order, that is, each node is selected only after all of its descendant nodes have been selected. The reverse topological selection of the nodes can be achieved by passing through the nodes and selecting only those nodes which do not have any outgoing arcs. On the next and each subsequent pass through the nodes, those nodes which were not previously selected and only have arcs pointing to previously selected nodes, are selected. This process continues passing through the nodes, until all nodes have been selected.

For each selected node (and the procedure it represents), the optimizing process of FIG. 2 proceeds to step 108, where the node is evaluated to determine whether it has any outgoing arcs. This evaluation is equivalent to determining whether the procedure represented by the node calls any other procedures as identified by the call graph.

If in step 108, the current node has an outgoing arc, then the procedure represented by the current node calls a child procedure. In this case, the optimizing process proceeds to step 110, in which the frequently executed path(s) of the child procedure is(are) inlined into the procedure represented by the current node, if appropriate. As will be discussed below in connection with FIG. 2A, only some child procedures are inlined into their parent procedures, based on various criteria to be discussed in reference to FIG. 2B.

After step 110, or immediately after step 108 if the procedure represented by the current node in the call graph does not call any child procedures, the optimizing process determines whether the procedure identified by the current node has at least one parent procedure as described by the call graph (step 112).

If there is an arc from any node in the call graph to the current node, then the procedure represented by the current node has a parent in the call graph. In this case, the optimizing process proceeds to step 114, in which the frequently executed path(s) of the procedure represented by the current node in the call graph, is(are) cached into memory, if appropriate. As will be discussed below in connection with FIG. 2B, only some child procedures in the call graph are cached into memory for subsequent inlining into their parent procedures, based on predetermined criteria to be discussed below.

After step 114, or immediately following step 112 if the procedure represented by the current node in the call graph does not have any parent procedures, processing proceeds to step 116, in which it is determined whether there are any more nodes in the call graph to be processed, i.e., whether all procedures in the program have been processed. If there are more procedures to be processed, the optimizing process returns to step 108; otherwise, the optimizing process is completed (step 118).

Figure 2A:
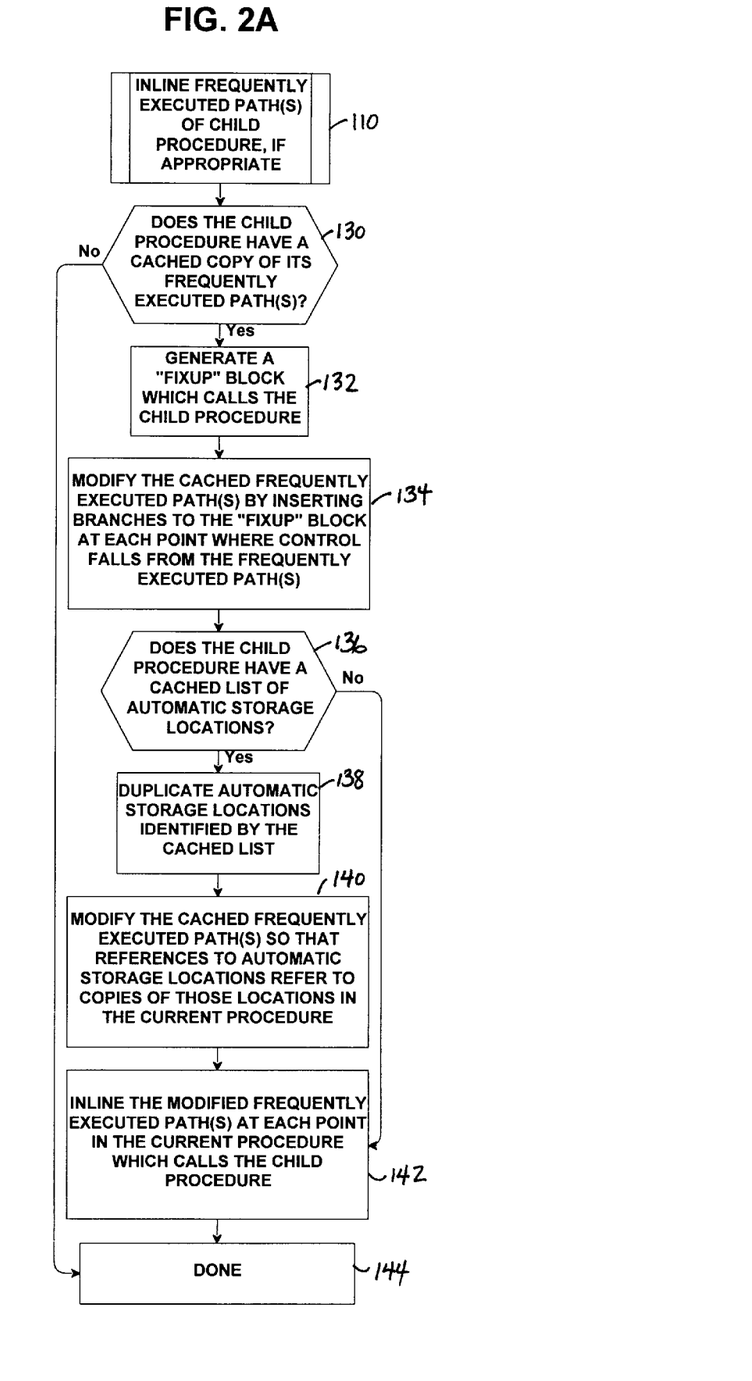
FIG. 2A is a flow chart of specific operations performed as part of inlining a frequently executed path of a child procedure into a parent procedure, where appropriate.

Referring now to FIG. 2A, as discussed above, in step 110 of the optimizing process of FIG. 2, the frequently executed path(s) of a child procedure is(are) inlined into a parent procedure, if appropriate. As discussed in more detail below with reference to FIG. 2B, those child procedures which are eligible for inlining into parent procedures, have their frequently executed path(s) cached into memory, along with various identifying information. If a child procedure is ineligible for inlining, it is not cached into memory. Accordingly, in a first step 130, the optimizing process determines whether the child procedure to be potentially inlined, has (a) frequently executed path(s) cached into memory. If not, then the child procedure is chosen not to be inlined, and step 110 is completed (step 144).

If there is a frequently executed path for the child procedure cached into memory, then the child procedure may be inlined into its parent procedure. In this case, the optimizing process proceeds to step 132.

In step 132, a "fixup" block is created and added to the program. The fixup block contains only those statements which are needed to invoke the original, complete child procedure. The fixup block is created in order to simplify the frequently executed path(s) of the child procedure which is(are) to be inlined into the parent procedure.

Specifically, in step 134, the cached frequently executed path(s) of the child procedure is(are) modified by inserting branches to the fixup block at each point (statement) in the frequently executed path(s) where control flow falls from the frequently executed path(s). For example, if a frequently executed path includes an IF statement, and one branch of the IF statement is in the frequently executed path(s) and the other is not, then in the other branch, a branch to the fixup block is inserted. As noted above, the fixup block invokes the entire, unmodified child procedure. Thus, in those situations where flow through the child procedure departs from a cached frequently executed path of the child procedure, then the entire child procedure is re-executed in its original form. Thus, there is some speed and efficiency penalty associated with a circumstance which causes execution to depart from the frequently executed path(s) of an inlined child procedure; however, in accordance with the criteria discussed below in connection with FIG. 2B, this penalty is more than offset by the improvement in speed and efficiency obtained when execution flows through the frequently executed path(s) of an inlined child procedure.

After generating the fixup block and modifying the cached frequently executed path(s), the optimizing process proceeds to step 136, in which the optimizing process determines whether the memory cache contains a list of automatic storage locations which are generated by the child procedure. As discussed above, automatic storage locations are generated by a procedure when the procedure causes data to be stored in temporary memory locations, which are not used outside of the procedure. A compiler recognizes the generation of an automatic storage location based on the syntax of the computer programming language in use. A compiler may also generate code to allocate automatic storage locations not specified in the source code, in order to hold temporary results of intermediate calculations.

If there are statements in the cached frequently executed path(s) of the child procedure that access data in automatic storage locations, then the parent procedure must be modified to allocate corresponding automatic storage locations, and the inlined copy of the frequently executed path(s) must be modified to access the parent's locations rather than those of the child. This is necessary, since the automatic storage locations of the child will not exist while executing the inlined code. If flow through the inlined code departs from the child's frequently executed path(s), the call to the original child procedure will not be affected by modifications to the parent's copy of the automatic storage locations; the child will instead use its own newly allocated storage locations.

To avoid this difficulty, if in step 136, there is a cached list of automatic storage locations in memory, the optimizing process proceeds to step 138, in which duplicates are made of the automatic storage locations referenced in the cached list. (Typically, the parent procedure is modified to allocate storage in its invocation stack frame to contain the duplicated storage locations.) Then, in step 140, the cached frequently executed path(s) through the child procedure is(are) modified so that all references to automatic storage locations refer to the duplicates of those locations made in step 138.

Following step 140, or immediately after step 136 if there are no cached lists of automatic storage locations for the frequently executed path(s) of the child procedure, the optimizing process proceeds to step 142, in which the modified frequently executed path(s) of the child procedure are inlined into the parent procedure at each point (statement) in the parent procedure which calls the child procedure. Once this is completed, the inlining of the child procedure is done (step 144).

Figure 2B:
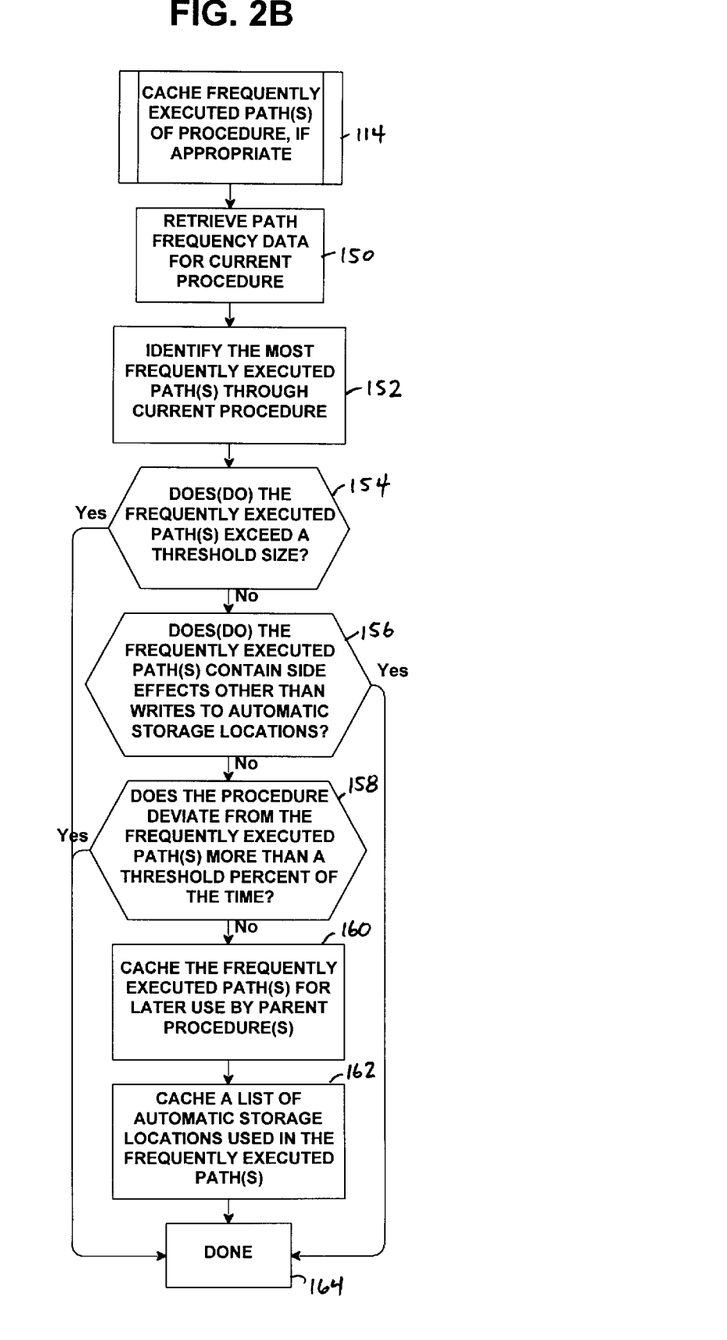
FIG. 2B is a flow chart of specific operations performed as part of caching a frequently executed path of a child procedure, where appropriate.

Referring now to FIG. 2B, the activities involved in step 114, to cache the frequently executed path(s) of a child procedure, if appropriate, are described. In a first step 150, the path frequency data for the current procedure (generated in step 102) is retrieved. Next, in step 152, this path frequency data is analyzed to identify the most frequently executed path(s) through the procedure.

As discussed below, in one method for identifying path frequencies for a procedure, a count is taken of the number of times that each possible path is taken through the procedure during test execution of the program. The most frequently executed path(s) through the procedure are those paths which accumulate the greatest counts during test execution. There may be two or more parallel paths which are executed at nearly similar frequency, accordingly, there may be more than one frequently executed path through the program which is identified in step 152.

In one embodiment of the present invention, only the most frequently executed path is identified in step 152, without regard to other paths through the procedure which are nearly as frequently executed. In another approach to step 152, if the most frequently executed path through the procedure has fewer statements than the predetermined threshold size used in step 154 (see below), then the next-most-frequently executed path is also included in the selected paths if it can be included without exceeding the threshold size used in step 154, then the next-most-frequently executed path is also included in the selected paths if it can be included without exceeding the threshold size used in step 154, and so on, until no further next-most-frequently executed parallel paths can be included without exceeding the threshold maximum number of statements established in step 154. For relatively small procedures, this latter method might ultimately incorporate the entire small procedure, and all paths through the procedure, into the selected path(s) identified in step 152. Thus, for small procedures, the entire procedure is inlined in accordance with the principles of the present invention just as is done in conventional inlining processes. However, unlike conventional inlining, for larger procedures, only some of the path(s) through the procedure are selected in step 152, and ultimately inlined into the parent procedure as discussed above and in more detail below.

After identifying the frequently executed path(s) of the procedure, in step 154, the number of statements (or object code size, if measurable) of the path(s) is compared to a threshold. If the size of the frequently executed path(s) of the procedure exceeds the threshold, then the procedure will not be inlined, and no further action is taken to cache the procedure (step 164). The threshold is chosen to prevent inlining of frequently executed path(s) which are so large that the efficiency gained by inlining the path(s) is insufficient to justify the increased program size. In one embodiment, this threshold may be a fixed number of statements or object code instructions; in another embodiment, this threshold may be adjustable based on the number of locations in which the frequently executed path(s) will be inlined in parent procedures, and/or the size of memory available in a particular computer system for which the program is intended, or other factors. In a further embodiment, this threshold may be specifiable by the user.

If the size of the frequently executed path(s) does not exceed the threshold, then processing proceeds to step 156, in which the frequently executed path(s) is(are) evaluated to determine whether there are any side effects in the path(s) other than writes to automatic storage locations. Two kinds of side effects are of concern: modifications of memory, and exceptions. If a non-automatic memory location is modified by the frequently executed path(s), then it is possible that when flow falls off of the inlined path(s), and the entire original child procedure is started over, the result will not be the same as calling the original procedure directly. (For example, the child procedure might read the modified storage location.) Similarly, if the frequently executed path(s) can cause an exception (e.g., overflow, divide by zero, illegal storage reference, etc.), then the effect of falling off the inlined frequently executed path(s) and calling the original child procedure over again, might have different semantics than calling the original child procedure directly. So if the frequently executed path(s) contain(s) these kinds of side effects, no further action is taken to cache the procedure (step 164).

If there are no side effects in the procedure other than writes to automatic storage locations, then processing proceeds to step 158, in which the path frequency data is evaluated to determine the frequency with which passes through the procedure, are expected to deviate from the frequently executed path(s) through the procedure that were identified in step 152. E.g., if the ratio of the frequency of the frequently executed path(s) to the frequency of all paths is less than a threshold percentage, then the optimizing process proceeds to step 164, and the frequently executed path(s) of the procedure are not cached. On the other hand, if the ratio of the frequency of the frequently executed path(s) to the frequency of all paths is greater than a threshold percentage, then the optimizing process proceeds to step 160, to begin the process of caching the selected frequently executed path(s) into memory. The threshold frequency used in step 158, is selected to prevent inlining of child procedures which deviate so frequently from their selected frequently executed path(s) that the efficiency gain obtained from inlining the frequently executed path(s) of the procedure is more than offset by the efficiency penalties associated with repeating the complete child procedure in those instances where execution of the procedure deviates from the frequently executed path(s).

Assuming the selected frequently executed path(s) pass the tests of steps 154, 156 and 158, the optimizing process proceeds to step 160, in which the frequently executed path(s) is(are) cached into memory for later inlining into parent procedures, as discussed above. Next, in step 162, a list of automatic storage locations used in the cached frequently executed path(s) is cached into memory, for later use when inlining the frequently executed path(s) into parent procedures, as discussed above. After these steps, processing of the procedure is completed (step 164).

Following the foregoing procedures, a computer program may be optimized by inlining one or more paths through a child procedure into a parent procedure, without inlining the entirety of the child procedure, resulting in substantially improved speed of execution of the program with reduced expense in terms of program size.

It will therefore be appreciated that the invention provides significant advantages in terms of optimization of computer procedures during compilation, resulting in more efficient compilation. It will also be appreciated that numerous modifications may be made to the disclosed embodiments consistent with the invention, without departing from the spirit and scope of the invention. For example, while in the foregoing, the use of a fixup procedure is described when program flow deviates from an inlined frequently executed path, other fixup mechanisms could be used, provided that the combined inlined code and fixup code are semantically equivalent to the original procedure call. Therefore, the invention lies in the claims hereinafter appended.

What is claimed is:

1. A method for optimizing a computer program including a child procedure and a parent procedure which includes one or more statements that invoke the child procedure, comprising selecting one or more paths through the child procedure, the one or more paths including fewer than all of the paths through the child procedure, and inlining the one or more paths from the child procedure of said computer program into the parent procedure, in place of the one or more statements that invoke the child procedure without inlining into the parent procedure at least one reachable path through the child procedure that can be traversed upon invocation of the child procedure via the parent procedure.

2. The method of claim 1 further comprising generating an estimate of path frequencies for one or more procedures of the computer program prior to said selecting and inlining, and wherein the one or more paths through the child procedure are selected in response to the estimate of path frequencies.

3. The method of claim 2 wherein the estimate of path frequencies is generated by dynamic profiling of procedures of the computer program.

4. The method of claim 2 wherein the estimate of path frequencies is generated by static heuristic analysis of procedures of the computer program.

5. The method of claim 2 wherein the estimate of path frequencies is generated from user-generated indications of frequently executed paths.

6. The method of claim 2 wherein one or more frequently traversed paths through the child procedure is selected in response to the estimated path frequencies.

7. The method of claim 2 wherein a most frequently traversed path through the child procedure is selected in response to the estimated path frequencies.

8. The method of claim 2 further comprising determining from the estimated path frequencies whether execution of the child procedure deviates from the one or more selected paths through the child procedure more often than a predetermined threshold, and inlining said one or more selected paths through the child procedure only if execution of the child procedure deviates from the one or more selected paths less often than the predetermined threshold.

9. The method of claim 1 further comprising replacing a path of the child procedure which deviates from the one or more selected paths with one or more statements that complete the original child procedure.

10. The method of claim 9 further comprising generating fixup code including one or more statements invoking the complete original child procedure, and wherein paths of the child procedure which deviate from the one or more selected paths are replaced with the fixup code.

11. The method of claim 1, further comprising determining whether the one or more selected paths of the child procedure has side effects other than storage of data into temporary memory locations not used outside of the child procedure, and inlining said one or more selected paths through the child procedure only if the one or more selected paths do not contain side effects other than storage of data into temporary memory locations not used outside of the child procedure.

12. The method of claim 11, further comprising modifying the one or more selected paths through the child procedure if the one or more selected paths contain accesses to temporary memory locations not used outside of the child procedure, by altering the accesses to said temporary memory locations to refer to copies of the temporary memory locations identified in the original child procedure.

13. The method of claim 1 further comprising determining whether the one or more selected paths through the child procedure exceed a predetermined size, and inlining said one or more selected paths through the child procedure only if the one or more selected paths do not exceed the predetermined size.

14. A computer system for compiling a computer program including a child procedure and a parent procedure which includes one or more statements that invoke the child procedure, into a machine-readable representation, the computer system comprising:

(a) an optimizer that optimizes the computer procedure into an optimized representation, the optimizer selecting one or more paths through the child procedure, the one or more paths including fewer than all of the paths through the child procedure, and inlining the one or more paths from the child procedure of said computer program into the parent procedure, in place of the one or more statements that invoke the child procedure without inlining into the parent procedure at least one reachable path through the child procedure that can be traversed upon invocation of the child procedure via the parent procedure; and (b) a machine-readable code generator that generates a machine-readable representation of the computer procedure from the optimized representation.

15. The computer system of claim 14 wherein the optimizer also generates estimates of path frequencies for each procedure of the computer program prior to selecting and inlining the one or more paths through the child procedure, and selects the one or more paths in response to the generated estimated path frequencies.

16. The computer system of claim 15 wherein the estimate of path frequencies is generated by dynamic profiling of procedures of the computer program.

17. The computer system of claim 15 wherein the estimate of path frequencies is generated by static heuristic analysis of procedures of the computer program.

18. The computer system of claim 15 wherein the estimate of path frequencies is generated from user-identified indications of frequently executed paths.

19. The computer system of claim 15 wherein the optimizer selects a frequently traversed path through the child procedure in response to the estimated path frequencies.

20. The computer system of claim 14 wherein the optimizer replaces a path of the child procedure which deviates from the one or more selected paths with one or more statements that complete the original child procedure.

21. A program product, comprising:

(a) a program configured to optimize a computer program including a child procedure and a parent procedure which includes one or more statements that invoke the child procedure, by selecting one or more paths through the child procedure, the one or more paths including fewer than all of the paths through the child procedure, inlining the one or more paths from the child procedure of said computer program into the parent procedure, in place of the one or more statements that invoke the child procedure without inlining into the parent procedure at least one reachable path through the child procedure that can be traversed upon invocation of the child procedure via the parent procedure; and (b) a signal bearing media bearing the program.

22. The program product of claim 21 wherein the program also generates estimates of path frequencies for each procedure of the computer program prior to selecting and inlining the one or more paths through the child procedure, and selects the one or more paths in response to the estimated path frequencies.

23. The program product of claim 22 wherein the program selects a frequently traversed path through the child procedure in response to the estimated path frequencies.

24. The program product of claim 21 wherein the program replaces a path of the child procedure which deviates from the one or more selected paths with one or more statements that complete the original child procedure.

25. The program product of claim 21, wherein the signal bearing media is a transmission type media.

26. The program product of claim 21, wherein the signal bearing media is a recordable media.

* * * * *